(12) United States Patent
Stryker (10) Patent No.: US 11,429,704 B2
(45) Date of Patent: Aug. 30, 2022

(54) PACKAGING WITH AUTOMATIC AUTHENTICATION SYSTEM FOR PACKAGED PRODUCT

(71) Applicant: Apple Inc., Curpertino, CA (US)

(72) Inventor: James A. Stryker, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 16/560,687

(22) Filed: Sep. 4, 2019

(65) Prior Publication Data

US 2020/0089861 A1    Mar. 19, 2020

Related U.S. Application Data

(60) Provisional application No. 62/732,740, filed on Sep. 18, 2018.

(51) Int. Cl.
| | | |
|---|---|---|
| *G06F 21/34* | (2013.01) |
| *G06K 19/07* | (2006.01) |
| *B65D 75/54* | (2006.01) |
| *B65D 75/14* | (2006.01) |
| *H04W 12/06* | (2021.01) |

(52) U.S. Cl.
CPC ............ *G06F 21/34* (2013.01); *B65D 75/14* (2013.01); *B65D 75/54* (2013.01); *G06K 19/0723* (2013.01); *H04W 12/06* (2013.01)

(58) Field of Classification Search
CPC .... G06F 21/34; B65D 75/54; G06K 19/0723; H04W 12/06
USPC .......................................................... 726/20
See application file for complete search history.

(56) References Cited

U.S. PATENT DOCUMENTS

| | | | |
|---|---|---|---|
| 5,842,629 A | 12/1998 | Sprague | |
| 7,098,794 B2 | 8/2006 | Lindsay | |
| 8,295,811 B1 | 10/2012 | Gailloux et al. | |
| 9,796,162 B2 | 10/2017 | Thorogood | |
| 10,262,319 B1 * | 4/2019 | Benkreira | G08B 25/08 |
| 2001/0054755 A1 | 12/2001 | Kirkham | |
| 2002/0088855 A1 | 7/2002 | Hodes | |

(Continued)

FOREIGN PATENT DOCUMENTS

| | | |
|---|---|---|
| CN | 1701344 A | 11/2005 |
| CN | 203078858 U | 7/2013 |

(Continued)

OTHER PUBLICATIONS

Schilling, J., et al. "Secured Miniaturized System-in-Package Contactless and Passive Authentication Devices featuring NFC," 2016 Euromicro Conference on Digital System Design (DSD), Limaol, Aug. 2016, pp. 439-445.

(Continued)

*Primary Examiner* — Michael G Lee
*Assistant Examiner* — David Tardif
(74) *Attorney, Agent, or Firm* — Sterne, Kessler, Goldstein & Fox P.L.L.C.

(57) ABSTRACT

A product with packaging includes an envelope having a cavity. An envelope flap may be opened, and may initiate a smart packaging feature, such as an NFC chip embedded in the packaging. The NFC chip may search for an electronic device, such as the electronic device of the specific user, and once connected may initiate or carry out an authentication process or activation process.

20 Claims, 4 Drawing Sheets

(56) References Cited

U.S. PATENT DOCUMENTS

| | | |
|---|---|---|
| 2005/0171898 A1 | 8/2005 | Bishop |
| 2007/0013521 A1 | 1/2007 | Lindsay |
| 2007/0040683 A1 | 2/2007 | Oliver |
| 2007/0152829 A1 | 7/2007 | Lindsay |
| 2007/0194945 A1 | 8/2007 | Atkinson |
| 2007/0290858 A1 | 12/2007 | Janke |
| 2009/0193500 A1 | 7/2009 | Griffin |
| 2011/0140841 A1 | 6/2011 | Bona |
| 2012/0225639 A1 | 9/2012 | Gazdzinski |
| 2012/0298736 A1 | 11/2012 | Haddad |
| 2014/0138275 A1* | 5/2014 | Magnusson ............ G06F 1/3215 455/566 |
| 2016/0314635 A1 | 10/2016 | Chen |
| 2017/0011287 A1 | 1/2017 | Kapp |
| 2017/0132565 A1 | 5/2017 | Beadles |
| 2018/0025349 A1 | 1/2018 | Marsh |
| 2018/0117944 A1 | 5/2018 | Lee |
| 2018/0189527 A1 | 7/2018 | Kim |
| 2019/0130689 A1* | 5/2019 | Baumgarte ......... G07C 9/00571 |

FOREIGN PATENT DOCUMENTS

| | | |
|---|---|---|
| CN | 106028312 A | 4/2016 |
| CN | 107636694 A | 1/2018 |
| ES | 2464873 A2 | 6/2014 |
| KR | 20140101518 A | 8/2014 |
| KR | 20160144101 A | 12/2016 |
| WO | 01/31558 A2 | 5/2001 |
| WO | WO 01/31558 A2 | 5/2001 |
| WO | 2007/096898 A2 | 8/2007 |
| WO | 2020/060766 A1 | 3/2020 |

OTHER PUBLICATIONS

Liu, S., et al., "A Security-Enhanced Express Delivery System based on NFC," 2016 13th IEEE International Conference on Solid-State and Integrated Circuit Technology (ICSICT), Hangzhou, Oct. 2016, pp. 1534-1536.

Dhokia, Kavi: "Tap to Activate Your Debit Card", Nov. 14, 2017, XP002798914; https://monzo.com/blog/2017/11/14/nfc-card-activation#article.

* cited by examiner

PACKAGING WITH AUTOMATIC AUTHENTICATION SYSTEM FOR PACKAGED PRODUCT

CROSS-REFERENCE TO RELATED APPLICATIONS

This application claims priority to U.S. Provisional Patent Application No. 62/732,740, filed Sep. 18, 2018, titled "Packaging with Automatic Authentication System," which is incorporated herein in its entirety by reference for all purposes.

FIELD

The described embodiments relate generally to retail packaging. More particularly, the present embodiments relate to "smart" packaging using communication systems such as near field communication ("NFC") in order to provide automatic activation, authentication, etc., when a user opens the packaging.

BACKGROUND

Connected or "smart" packaging may include certain sensors or communication tools to track packages in transit, or provide additional information about a product to a consumer (e.g., through a digital application or visual display). Such tools simply provide information. They do not take part in activation, authentication, etc., of a product when a user opens or receives the packaging.

SUMMARY

Some embodiments include packaging, such as an envelope or box. The packaging includes a smart packaging system (e.g., an active packaging system); including a system such as an NFC system that includes a data chip, such as an RFID chip, or specifically an NFC chip, etc. The system may include a power source (e.g., a battery such as a micro-battery). When the packaging is opened, the NFC chip is powered on and begins searching for an electronic device to carry out an authentication function, an activation function, or the like. Other modes of powering on and activating the NFC chip are contemplated, for example interacting with a particular feature of the packaging. While discussed generally with the relation to NFC technology, other modes is data and energy transmission are contemplated, such as different radio frequency (RF) schemes like RFID, Bluetooth, acoustic, Wi-Fi, or other acceptable modes of data and energy transmission. Passive NFC technology is also contemplated with respect to device activation or authentication.

As an envelope, the packaging may include an opening or cavity that may receive a product, such as gift card, credit card, membership card, or other suitable product to be packaged in an envelope. The packaging may include a flap to enclose product within the packaging. The NFC chip may be embedded within a surface of the packaging, or affixed to a surface of the packaging (either interior or exterior). An activation mechanism may be separately embedded in a movable surface of the packaging, such as a flap of an envelope. The activation mechanism may be, for example a small permanent magnet to activate a Hall effect sensor within the active packaging system, or other suitable mechanism by which the active packaging system (such as the NFC chip) may be triggered to power on when the packaging is opened. In the case of a passive NFC chip, an element that disturbs the electromagnetic field near the chip may be used to effectively deactivate the chip, and its removal may effectively activate the passive chip.

The packaging may be activated via breaking a circuit or connecting a circuit, when the packaging is opened. For example, when an envelope flap is opened, or a pull-tab is removed, a circuit may close (or open) providing the NFC chip with a connection to a power supply such that it turns on. Once the NFC chip is activated, it searches for an electronic device such as a mobile phone with an NFC transceiver, and initializes the authentication or activation of the product via the electronic device automatically.

The packaging may be formed of different materials than the product (e.g., the packaging may be formed of a cellulose-based material and the product may be formed of or include a metallic material). For example, the packaging may be made from paper, molded fiber, corrugated cardboard, etc. In some embodiments, all or some of the packaging may be made from polymeric materials. In any event, packaging may be formed from radio transmissive materials. The packaging may include additional space to receive a second product that does not require authentication or activation.

Advantageously, this improves upon prior systems having, for example, manual authentication or activation that may provide a more difficult customer experience. In contrast to prior systems that require forcing a user to manually telephone an activation line, or manually navigate to a website, the customer experience is improved by removing those impediments to authentication or activation. By designing smart, connected packaging that automatically authenticates or activates a product with minimal impact to the user, efficiency is improved along with the user experience.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Product packaging is an integral part of a customer's experience. It introduces the customer to their product, and can affect the customer's feelings toward the product and the company that created it. Seamless packaging that allows for an individual to automatically authenticate or activate products—removing any barriers to their use—may be particularly desirable.

In the same vein, companies may be sensitive to the cost of packaging and may wish to promote packaging that is eco-friendly. Certain packaging materials are higher cost due to their processing, and while engineers may be able to design single-component packaging, the cost may be prohibitive for certain materials. Optimization of packaging in material usage may help keep costs low, and if done well may not interfere with, and may promote, a positive user experience. Packaging made out of recyclable and/or biodegradable materials, such as paper or other cellulose-based products, can reduce environmental impact. Packaging that is interesting in character and well-executed may boost a product's or a brand's reputation, thereby attracting new customers and retaining previous customers.

Packaging described in this document achieves these and other beneficial characteristics by balancing smart connectivity and efficiency, structural robustness, eco-friendly materials, and aesthetic elements.

A package may contain a product that may be desirable to authenticate, or that may require activation (e.g., a credit card or a gift card). To limit authentication and activation to authorized users, such as the purchaser of the product, automatic authentication or activation may be initiated when the package is opened by an authorized user. The packaging may include electronics such as an NFC chip (such as an active NFC chip) that may communicate with an electronic device in order to carry out the authentication or activation function. In this way, some of the required electronics to communicate with electronic device for authentication or activation may be housed within the packaging and not the product. Advantageously, this allows for added space and efficiency within the product such that electronics that are only used for authentication are not contained within the product. This is especially beneficial for products with small design footprints, or if a product requires a one-time-only activation or authentication. Communication may be bidirectional or unidirectional, as indicated by the arrows shown in FIGS. 2 and 3, for example.

The packaging may be retail packaging (i.e., finished packaging for containing and conveying a product to a user such as may be used in a retail setting, not shipping packaging for containing a packaged product during shipment) that one may expect to find on the shelf in a retail store, and which one may open after purchase to directly access their product. A product contained by the packaging may be, for example, a credit card, gift card, membership card or the like; or an electronic device such as, for example, a laptop, tablet computer, or smartphone; or it may be a non-electronic device, such as, for example, a book.

These and other embodiments are discussed below with reference to the accompanying figures. However, those skilled in the art will readily appreciate that the detailed description given herein with respect to these figures is for explanatory purposes only and should not be construed as limiting.

Figure 1:
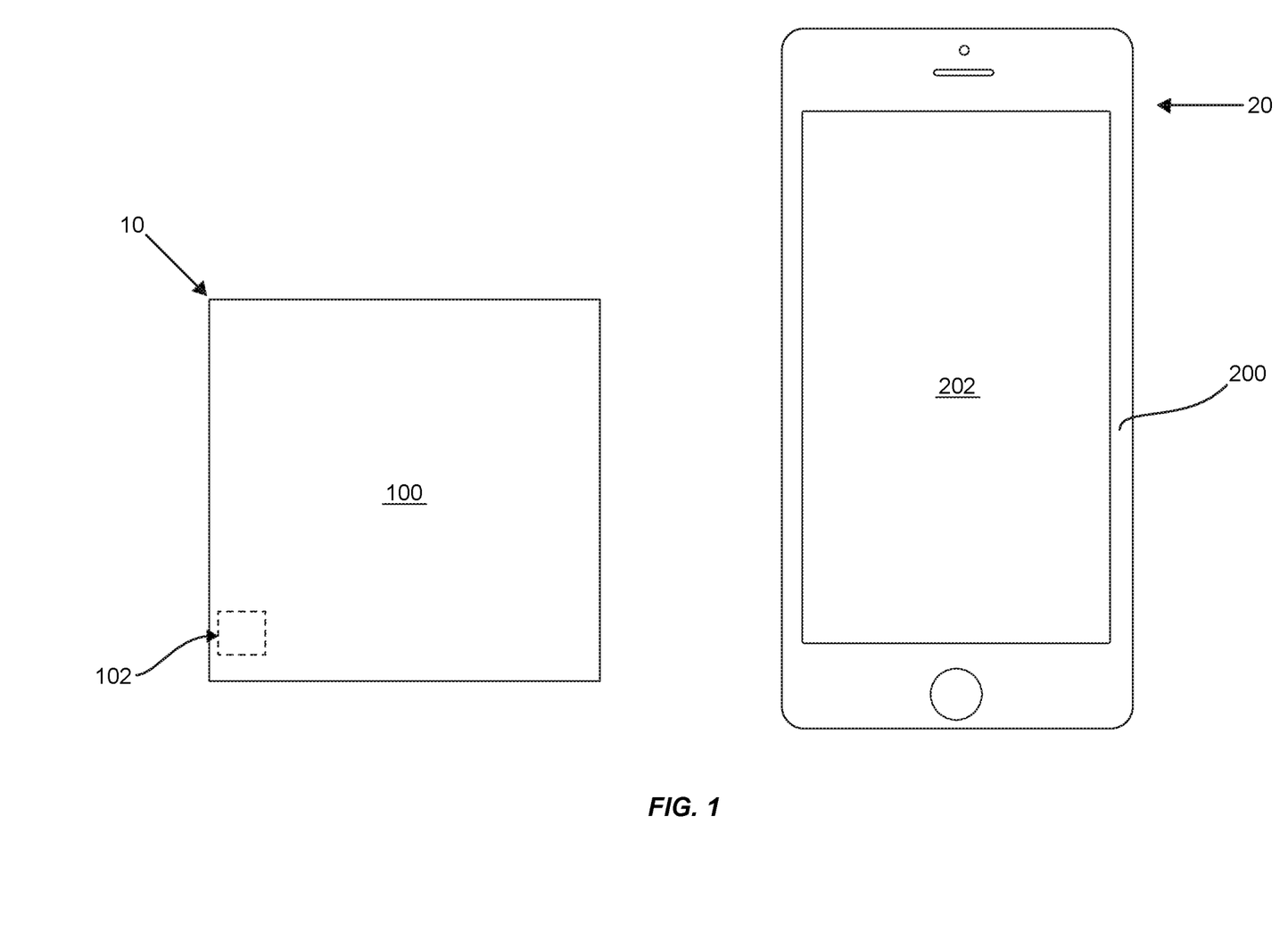
FIG. 1 shows a schematic illustration of packaging and an electronic device.

FIG. 1 shows a schematic illustration of packaging 10 and an electronic device 20. Packaging 10 comprises an envelope flap 100, and automatic authentication system 102, for example an NFC system. FIG. 1 shows the packaging 10 in an unopened state such that no automatic activation or authentication has been or will be performed with reference to any product contained within packaging 10. Electronic device 20—for example a user's mobile phone, tablet, smart watch, laptop, desktop, etc.—includes a body 200 that may house electronics of electronic device 20, and generally may include a screen 202, for example a touchscreen (or other user interface).

For certain products, such as a credit card, activation and authentication would previously have been accomplished by manually calling a telephone number, manually navigating to and typing in information at website, or via an application-based process where the user manually authenticates themself in some manner and then confirms the card is in their possession. The user may be prompted to start this process by following instructions written on a sticker applied to the credit card. While a manual authentication option such as one of these that would allow for non-automatic modes of activation or authentication may be useful and may be included in some embodiments as a fallback option, FIG. 2 shows an example of how this manual process is initially avoided.

Figure 2:
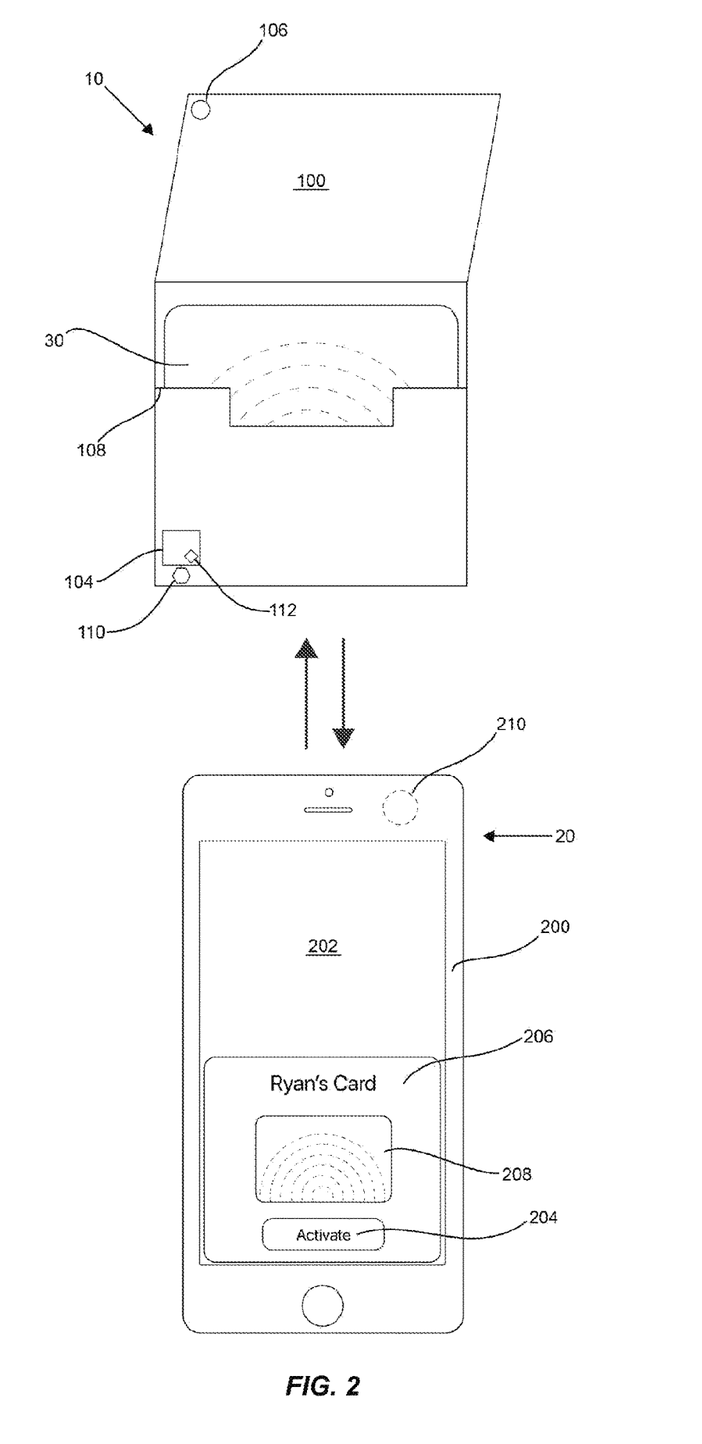
FIG. 2 shows a schematic illustration of the packaging and electronic device shown in FIG. 1, with the packaging being opened and the NFC chip communicating with the electronic device.

FIG. 2 shows a schematic illustration of the packaging and electronic device shown in FIG. 1, with the packaging 10 being opened and an NFC chip 104 communicating with the electronic device 20, for example through an NFC transceiver 210 in electronic device 20. This communication may be bidirectional, as indicated by the arrows shown between packaging 10 and electronic device 20, or may be in one direction from NFC chip 104 to transceiver 210. With reference to packaging 10, with envelope flap 100 open a product 30 may be revealed within the envelope's cavity 108. As described, product 30 may be a type of card, for example a credit card, debit card, gift card, membership card, etc. The user, for example purchaser of the product 30, then may remove product 30 from packaging 10.

In some embodiments, automatic authentication system 102 includes NFC chip 104 and activation element 106. Activation element 106 may be, for example a magnet. In this way automatic authentication system 102 may be activated and NFC chip 104 powered on through power source 112 (e.g., micro battery) in response to a Hall effect sensor 110 associated with NFC chip 104 detecting a change in magnetic field as activation element 106 moves away from NFC chip 104, as packaging 10 is opened. In some embodiments, activation element 106 may be a mechanical switch, proximity sensor, or other suitable means for powering on and activating NFC chip 104. In some embodiments, removal of product 30 from packaging 10—rather than opening of packaging 10—may activate activation element 106, for example through a proximity sensor, weight sensor, etc.

As shown in FIG. 2, when the user opens packaging 10, NFC chip 104 is powered on, or activated/triggered, and may initiate searching for electronic device 20, e.g., determining whether there is an NFC signal to be received, or broadcasting a signal to be received by a reader (e.g., by an NFC transceiver 210) of another device (e.g., electronic device 20). Screen 202 of electronic device 20 may display a graphical user interface 206 when NFC chip 104 finds and communicates to electronic device 20 through NFC transceiver 210. Graphical user interface 206 may include, for example text information about product 30, for example a description of the product, serial number or identification number, or other useful information to the user. In some embodiments, graphical user interface 206 may include an image 208 representing the product, as shown in FIG. 2. A user may interact with graphical user interface 206 by touching, tapping, swiping, etc. on screen 202. Screen 202 may display other images or information about product 30, or may virtually zoom-in, zoom-out, translate, or rotate the image 208 of the product virtually in three dimensions as displayed on screen 202. Graphical user interface 206 may also include user interface activation element 204, for example an on-screen button that may be interfaced with by the user. User interface activation element 204 may execute a function, for example to initiate activation or authentication of product 30 via electronic device 20. In some embodiments, no further interaction by a user would be required to activate their product. From the user's perspective activation would be completed simply by opening the packaging and tapping the activate button on their smartphone.

As an example, a user may order a new credit card from a company. The company may prepare a credit card (product 30) for that particular user. The credit card may be packaged within packaging 10 including NFC chip 104. At this point the credit card is not active, and cannot be used. NFC chip 104 may be preprogrammed with data representing at least identification information for the particular card contained within the packaging, destined for the particular user. The data on NFC chip 104 may be encrypted or otherwise protected such that its information is not discoverable by unauthorized users.

The user's personal electronic device 20 may already be associated with the user's unique account (e.g., from the user's prior use of or access to the account using their personal electronic device). When the user receives their credit card packaged within packaging 10, and opens packaging 10, thereby activating NFC chip 104, the user may bring their personal electronic device 20 within the range of a data chip reader of their personal electronic device. When NFC chip 104 is within such range, it may send the data representing identification information for the particular card to the personal electronic device 20. The personal electronic device may communicate with a remote server of the company to determine if the unique account on the user's personal electronic device 20 matches an account of the intended recipient of the credit card. If so, the server may activate the credit card (or send a signal to the personal electronic device that initiates an activation process on the device). Otherwise, activation of the credit card will not occur, and an activation process will not be initiated.

In some embodiments, NFC chip 104 may be preprogrammed with data representing at least two pieces of information: (1) identification information for the particular card contained within the packaging, destined for the particular user; and (2) identification information for an account of the particular user. The latter information can be used to serve a gateway function, e.g., causing another step to trigger on device 20 such as a user interface displaying options for authentication and activation. In some embodiments, there may be a visual indicator on the packaging 10 such as an icon to indicate active packaging functionality. In some embodiments the visual indicator may include instructions, such as "To activate, wake device and hold below." The visual indicator may be proximate or on top of where chip 104 is located such that the user will be prompted to bring the packaging proximate the electronic device. When NFC chip 104 is brought within range of a personal electronic device 20, NFC chip 104 may send to electronic device 20 only the identification information for the account of the particular user. If this account information does not match or otherwise correspond acceptably to account information associated with the electronic device 20 (as determined either by NFC chip 104 or by electronic device 20 itself), activation of the credit card will not occur, and an activation process will not be initiated. In some embodiments, a second authentication may be required either before, after, or in parallel to the first authentication using a data chip. For example, a biometric recognition step may be required as a second authentication, e.g., a fingerprint authentication, facial recognition authentication, voice authentication, or other biometric authentication may be required in order for the product to be activated or authenticated.

While FIG. 2 shows packaging 10 as an envelope configuration, with activation element 106 embedded within flap 100, activation element 106 may take a different form, for example as attached to flap 100, or embedded in or attached to a pull-tab, tear-strip, a lid, or other removable or destructible component of packaging 10. In any event, upon activation via activation element 106, NFC chip 104 may power on (such as through a micro battery). In turn, the NFC chip 104 may—as it is programmed to do—search for a user device such as electronic device 20 when powered on.

Advantageously, by containing a power source and NFC chip within packaging 10 instead of a card product for example, challenges regarding constructing additional electronics within the card, including added size and weight from the additional electronics, etc., may be avoided. In some embodiments, the power source, such as a microbattery, may contain enough energy (i.e., battery life) for an expected duration from when the package 10 containing product 30 is shipped to when an end-user will open package 10 and complete the activation process. This is beneficial because it reduces power source complexity and moves relatively large NFC electronics out of a small volume allowance in a particular product 30, such as a card product, and into a large allowable volume within packaging.

Packaging 10 may be made from radio transmissive materials, for example cellulose-based materials, wood materials, nonmetallic polymer materials, etc. By using radio transmissive materials for packaging 10, communication from NFC chip 104 is made easier, for example if a product 30 is made from metallic materials, such as a metal shaped card product, such as a credit card having a metallic portion. In some embodiments, packaging 10 may include less relatively radio transmissive materials or non-radio transmissive materials, but instead may be provided with a radiofrequency (RF) transparent feature, such as an aperture or antenna window such that NFC chip 104 may communicate through packaging 10. The antenna may be, for example, a conductive metal trace such as copper, aluminum, silver, etc. In some embodiments, the chip or antenna may be directly printed on a paper or other cellulose substrate, such as one of the panels (e.g., in copper, silver, aluminum, or other metallic traces as an ink).

Additional details of the packaging construction and use of passive data chips may be found in co-pending U.S. patent application Ser. No. 16/354,730, filed Mar. 15, 2019, and is incorporated by reference herein in its entirety for all purposes.

Figure 3:
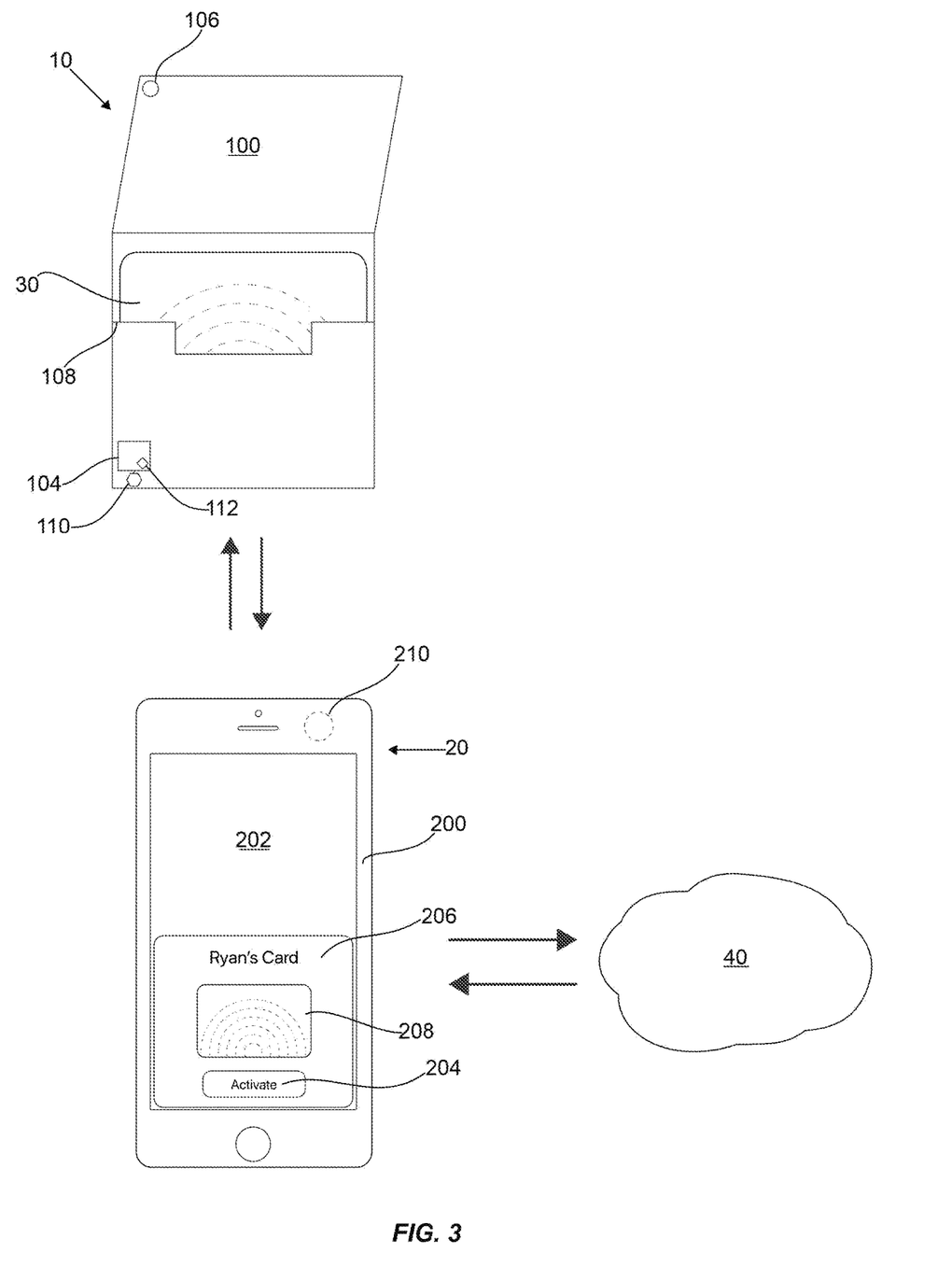
FIG. 3 shows a schematic illustration of the packaging and electronic device shown in FIGS. 1 and 2, with the packaging being opened and the NFC chip communicating with the electronic device, and electronic device communicating with a server.

Turning to FIG. 3, a schematic illustration of packaging 10 and electronic device 20 shown in FIGS. 1 and 2 is shown, with the packaging 10 being opened and the electronic device 20 communicating with a server 40, such as an external device or network. In some embodiments, electronic device 20 may communicate with server 40 in order to carry out an authentication, activation, or other smart packaging feature. Server 40 may include one or more of a database, server, Internet, network, or cloud-based server features such that product 30 may be authenticated or activated.

As discussed above, when the user opens packaging 30, NFC chip 104 is powered on (or woken up from a mid or low-power sleep state), and begins searching for electronic device 20. NFC chip 104 may be preprogrammed to begin an activation process or authentication process only upon finding an electronic device of a single particular user (e.g., by NFC chip 104 receiving communication from the particular user's electronic device). In some embodiments, this may be achieved by integrating information into NFC chip 104 that may identify electronic information stored in electronic device 20 correlated with a user's identity. For example, the user's electronic device 20 may communicate information showing that it is logged into an account of the user, or including a unique identifier that can be associated with the user (e.g., a user ID or a device serial number that is known to have been purchased by the user). This helps prevent NFC chip 104 from initiating an activation process with a device that does not belong to the particular user for which it is intended. For example, NFC chip 104 may include an authorized user's user ID or other user account information, and may only communication with an electronic device 20 that has a matching or otherwise corresponding user ID or account information (e.g., within an operating system of electronic device 20). Other software, firmware, hardware, etc. may be used. In some embodiments, device or user identity may be provided by a third-party source, such as a web-based application accessed on electronic device 20. In this regard, for NFC chip 104 to initiate authentication or activation functions, a user may be required to access such an application in order for device or user identification to proceed.

In some embodiments, NFC chip 104 may be preprogrammed to start activation or authentication processes on any electronic device, not necessarily tied to a particular user.

In some embodiments, NFC chip 104 may be preprogrammed to begin activation or authentication processes on any electronic device that is associated with a user (e.g., by being logged into an account of the user) that has ordered a particular type of product, and/or may be awaiting activation or authentication. If a product is fungible but still requires activation, e.g., in the case of a cash card, this allows NFC chip 104 to identify a corresponding electronic device 20 that belongs to a person that has a verified order for the fungible product. In this way, electronic device 20 may interface with a company's (e.g., the seller of the product) logistics platform, such that information about product 30 may be shared with an appropriate electronic device 20. Once the product 30 is authenticated or activated, electronic device 20 may communicate with the logistics platform to inform the company that the order is complete. Similarly, electronic device 20 may communicate to NFC chip 104 and disable any further attempts at activation or authentication.

Figure 4:
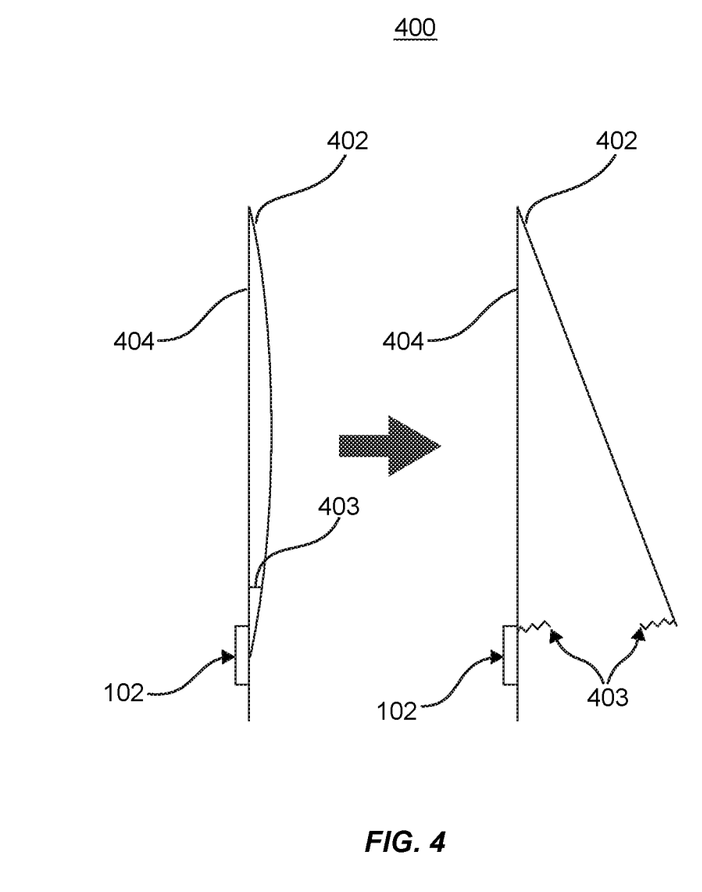
FIG. 4 shows a cross-sectional schematic view of packaging in a closed configuration on the left and an open configuration on the right.

FIG. 4 shows a cross-sectional schematic view of packaging in a closed configuration on the left and an open configuration on the right. Similar to FIGS. 1-3, FIG. 4 shows packaging 400, including packaging panel configured as a flap 402, which may be configured as an envelope flap. Panel 404 may cooperate with flap 402 to house a product. Automatic authentication system 102 may be activated in this case when flap 402 of packaging 400 is opened, which breaks a circuit element 403, thereby activating NFC chip 104 of an automatic authentication system 102. In some embodiments, this mode of activating automatic authentication system 102 may be reversible (i.e., circuit element may reconnect upon closure of flap 402), or it may be irreversible (i.e., circuit element may not reconnect upon closure of flap 402).

Figure 5:
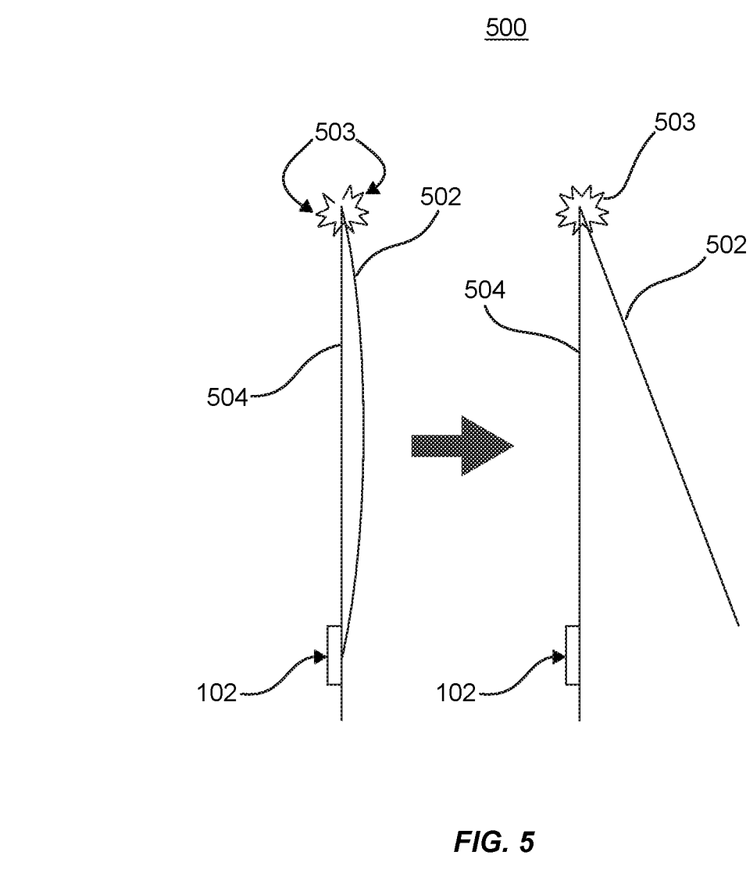
FIG. 5 shows a cross-sectional schematic view of packaging in a closed configuration on the left and an open configuration on the right.

Similar to FIG. 4, FIG. 5 shows packaging 500, including packaging panel configured as a flap 502, which may be configured as an envelope flap. Panel 504 may cooperate with flap 502 to house a product. Automatic authentication system 102 may be activated in this case when flap 502 of packaging 500 is opened, which connects circuit elements 503, thereby activating NFC chip 104 of automatic authentication system 102. Circuit elements 503 may be, for example, conductive pads or pins that activate a particular circuit. In some embodiments, this mode of activating automatic authentication system 102 may be reversible, or may be irreversible.

The packaging components may be composed of a recyclable material (e.g., a biodegradable or compostable material). If and when the customer opts to dispose of the packaging, because the packaging is recyclable or cellulose-based, the packaging may simply be recycled without requiring material separation (e.g., in a single-stream recycling program). In some embodiments, any electronics associated with active packaging system 102 may be removed from the packaging prior to recycling.

The packaging is constructed to give a clean, unitary appearance. This helps to reinforce its high quality and robust character, and that of the product 30. To achieve this appearance, seams, gaps, and raw material edges are minimized (raw material edges are edges formed by cutting through a flat material, where the substance of the material between its outer flat surfaces is revealed). The packaging may be a particular color, e.g., a brand-identifier color. In some embodiments, visible surfaces of packaging may be predominantly white, a color that cannot easily be achieved in recyclable cellulose-based materials. In some embodiments, components of the packaging may be folded from one or more sheets, such that when folded over and adhered together there is no raw edge on the outside of the component or packaging. In some embodiments, components of packaging may be constructed with multiple blanks.

Components of the packaging may be formed from one or more blanks. In some embodiments, the blank is formed of a single continuous substrate, such as, for example cellulose-based material like cardboard or paperboard. In some embodiments, interior surfaces of the packaging may be surface treated or coated, for example with a coating to protect the finished product. Tabs, flaps, and regions without adhesive of the blank are folded such that no adhesive is visible in finished packaging. In some embodiments, adhesive may be omitted and the various flaps and tabs attached in another suitable manner (e.g., by mechanical interlock, press fit, or lamination). Fold lines may be formed, for example, by weakening the substrate along the lines, such as by perforation, material crushing, scoring, miter cutting, etc.

In some embodiments, any surface finishing may take place after the components are cut from the blank, or alternatively prior to the blank being cut into separate sheets for assembling to a final package. Additionally, some operations may be performed concurrently.

Alternatively, some or all of the components described as being formed of cellulose-based material, such as cellulose fiber material like paper, may instead be formed of a polymeric material. Suitable polymeric materials include, but are not limited to, polyethylene, polypropylene, polyurethane, polystyrene, polymer blends including one or more of these polymers, or co-polymers including one or more of these polymers. All or some of the surfaces of the packaging may be coated, or laminated, which may increase structural strength properties such as rigidity and which may protect a product within the packaging, or avoid scratching.

Additionally, the packaging may be manufactured in a cost-effective and environmentally-friendly way. In some embodiments, the packaging components may be constructed of a single integrally-formed piece of material. The single integrally-formed piece of material may be a foldable material that is folded into a configuration that holds and secures a product, either alone or within a cavity of a packaging container. In some embodiments, the foldable material may be a single piece of material that is cut by a single operation (e.g., a single die-cutting operation). In some embodiments, the foldable material may be die cut from a stock material (e.g., a sheet or roll of material). Single integrally-formed pieces of material that are cut by a single cutting operation may facilitate efficient and reproducible manufacturing. Moreover, such manufacturing may reduce waste by reducing waste material during manufacturing.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. Packaging, comprising:
   a cavity configured to receive a product; and
   an automatic authentication system including an NFC chip and an activation element,
   wherein the activation element is configured to activate the authentication system to power on the NFC chip when the packaging is opened, or when the product is removed from the cavity,
   wherein when the NFC chip is powered on it automatically communicates with a user's personal electronic device to initiate an authentication process or an activation process of the product, and
   wherein the authentication or activation process includes display of information about the product on the user's personal electronic device.

2. The packaging of claim 1, wherein the activation element comprises:
   a sensor configured to detect when the packaging is opened, wherein in response to the sensor detecting the packaging is opened powering on the NFC chip.

3. The packaging of claim 2, wherein the sensor is a Hall effect sensor.

4. The packaging of claim 1, wherein the packaging is formed from radiotransmissive materials.

5. The packaging of claim 1, wherein the activation element comprises:
   a sensor configured to detect when a product within the packaging is removed from the cavity, wherein in response to the sensor detecting the product is removed powering on the NFC chip.

6. The packaging of claim 1, wherein the activation element comprises a sensor selected from the group consisting of a proximity sensor, a weight sensor, a Hall effect sensor.

7. The packaging of claim 1, further comprising:
   an opening in the packaging configured as an antenna window such that the NFC chip may communicate through the opening.

8. The packaging of claim 1, further comprising:
   a power source configured to supply power to the NFC chip.

9. The packaging of claim 1, wherein the NFC chip is preprogrammed to begin an activation or authentication process only upon receiving communication from an electronic device of a single particular user.

10. The packaging of claim 1, wherein the NFC chip is preprogrammed to begin an activation or authentication process only on an electronic device that is logged into an account of a user that has ordered a product of the type contained within the packaging.

11. A packaging envelope, comprising:
    a cavity configured to receive a card product;
    an active data chip embedded in a portion of the envelope; and
    a power source configured to provide power where the power source is configured to provide power to the chip upon opening the packaging.

12. The packaging envelope of claim 11, further comprising:
    a sensor configured to automatically allow the active data chip to begin broadcasting when the envelope is opened.

13. The packaging envelope of claim 11, wherein the data chip broadcasts a signal to a user's electronic device such that the electronic device communicates with a remote server to verify whether to authenticate or activate the card product only after the envelope is opened.

14. The packaging envelope of claim 13, wherein in response to the server verifying the authentication of the card product, the electronic device initiates a graphical user interface to complete the activation.

15. The packaging envelope of claim 11, further comprising:
    an antenna window, the antenna window configured to allow for data transmission or reception through the antenna window.

16. A fungible product, comprising:
    a metallic portion, wherein the fungible product is authenticated or activated via an authentication or activation process when the packaging it is or was contained in communicates with a predetermined user's personal electronic device, wherein the communication is carried out via a radio frequency communication between the packaging and the user's personal electronic device, wherein in response to an indication received by a remote server that the packaging is communicating with a user's electronic device that is not associated with the fungible product, the fungible product is not activated, and wherein when the fungible product is activated, the authentication or activation process includes display of information about the fungible product on the user's personal electronic device.

17. The fungible product of claim 16, wherein in response to the fungible product being activated, the user's electronic device communicates with a remote platform to inform the fungible product provider that the order is complete.

18. The fungible product of claim 16, wherein the packaging is recyclable.

19. The fungible product of claim 16, wherein the packaging is formed from radiotransmissive materials.

20. A fungible product, comprising: a metallic portion, wherein the fungible product is authenticated or activated via an authentication or activation process when the packaging it is or was contained in communicates with a predetermined user's personal electronic device, wherein the communication is carded out via a radio frequency communication between the packaging and the user's personal electronic device, wherein in response to the fungible product being activated, the user's personal electronic device communicates with a remote platform to inform the fungible product provider that the order is complete, and
wherein when the fungible product is activated, the authentication or activation process includes display of information about the fungible product on the user's personal electronic device.

\* \* \* \* \*

UNITED STATES PATENT AND TRADEMARK OFFICE
CERTIFICATE OF CORRECTION

| | |
|---|---|
| PATENT NO. | : 11,429,704 B2 |
| APPLICATION NO. | : 16/560687 |
| DATED | : August 30, 2022 |
| INVENTOR(S) | : Stryker |

It is certified that error appears in the above-identified patent and that said Letters Patent is hereby corrected as shown below:

On the Title Page

Column 1, Item (71), in "Applicant", Line 1, delete "Curpertino," and insert --Cupertino,--, therefor.

In the Claims

In Column 9, Claim 1, Line 44, delete "Packaging," and insert --A packaging,--, therefor.

In Column 11, Claim 20, Line 18, delete "carded" and insert --carried--, therefor.

Signed and Sealed this
Twentieth Day of June, 2023

*Katherine Kelly Vidal*

Katherine Kelly Vidal
*Director of the United States Patent and Trademark Office*